US010067535B2

(12) United States Patent
Prest et al.

(10) Patent No.: US 10,067,535 B2
(45) Date of Patent: Sep. 4, 2018

(54) MULTIPLE-ELEMENT LIGHT-BENDING STRUCTURES FOR MINIMIZING DISPLAY BORDERS

(71) Applicant: Apple Inc., Cupertino, CA (US)

(72) Inventors: Christopher D. Prest, San Francisco, CA (US); Tseng-Mau Yang, Cupertino, CA (US); Dale N. Memering, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1264 days.

(21) Appl. No.: 13/631,141

(22) Filed: Sep. 28, 2012

(65) Prior Publication Data

US 2014/0092028 A1    Apr. 3, 2014

(51) Int. Cl.
  *G09G 3/20* (2006.01)
  *G09G 3/36* (2006.01)
  *G06F 3/041* (2006.01)
  *G06F 1/16* (2006.01)

(52) U.S. Cl.
  CPC ............ *G06F 1/1643* (2013.01); *G06F 3/041* (2013.01)

(58) Field of Classification Search
  CPC ............... G02F 1/19; G09G 3/20; G02B 3/08
  USPC .......................... 345/173; 359/742, 448, 263
  See application file for complete search history.

(56) References Cited

U.S. PATENT DOCUMENTS

| 4,904,049 | A  | 2/1990  | Hegg |
| 6,927,908 | B2 | 8/2005  | Stark |
| 7,551,372 | B2 | 6/2009  | Xun et al. |
| 7,663,715 | B2 | 2/2010  | Jin et al. |
| 7,856,161 | B2 | 12/2010 | Tabor |
| 8,085,216 | B2 | 12/2011 | Miller |
| 8,368,729 | B2 | 2/2013  | Watanabe |
| 8,472,114 | B2 | 6/2013  | Watanabe |
| 8,541,934 | B2 | 9/2013  | Watanabe et al. |
| 8,690,414 | B2 | 4/2014  | Tomotoshi et al. |

(Continued)

FOREIGN PATENT DOCUMENTS

| EP | 2306437 | 6/2011 |
| EP | 2423906 | 2/2012 |

(Continued)

OTHER PUBLICATIONS

Yang et al., U.S. Appl. No. 13/631,024, filed Sep. 28, 2012.

*Primary Examiner* — Benjamin C Lee
*Assistant Examiner* — Dong Hui Liang
(74) *Attorney, Agent, or Firm* — Treyz Law Group, P.C.; G. Victor Tretz; Joseph F. Guihan

(57) ABSTRACT

An electronic device may be provided with a display mounted in a housing. The display may have an array of display pixels that provide image light to a user. The array of display pixels may form an active display structure with a rectangular shape. The rectangular active display structure may be surrounded by an inactive border region. Optical structures such as upper structures formed from a sheet of glass and lower optical structures that lie beneath the sheet of glass may be configured to bend light from the display pixels along the periphery of the active display structure. The upper optical structures may have an area that is larger than the area of the active display structure, so that the presence of the optical structures may serve to enlarge the apparent size of the display. The lower and upper optical structures may have curved surfaces for bending the light.

20 Claims, 14 Drawing Sheets

(56) References Cited

U.S. PATENT DOCUMENTS

| | | | |
|---|---|---|---|
| 8,692,737 B2 | 4/2014 | Watanabe et al. | |
| 8,907,863 B2* | 12/2014 | Li | G02F 1/13336 345/1.1 |
| 2001/0046365 A1 | 11/2001 | Bohle et al. | |
| 2002/0000967 A1 | 1/2002 | Huston et al. | |
| 2004/0100796 A1* | 5/2004 | Ward | G02B 6/0048 362/231 |
| 2006/0007369 A1 | 1/2006 | Jin et al. | |
| 2006/0077544 A1* | 4/2006 | Stark | G02F 1/13336 359/448 |
| 2008/0309633 A1 | 12/2008 | Hotelling et al. | |
| 2009/0059366 A1 | 3/2009 | Imai | |
| 2009/0103191 A1* | 4/2009 | Xun et al. | 359/742 |
| 2011/0025594 A1* | 2/2011 | Watanabe | G02F 1/13336 345/102 |
| 2011/0026090 A1* | 2/2011 | Minor | F41G 1/40 359/263 |
| 2011/0102302 A1* | 5/2011 | Watanabe | G02F 1/13336 345/4 |
| 2011/0109535 A1 | 5/2011 | Watanabe et al. | |
| 2011/0109622 A1 | 5/2011 | Son et al. | |
| 2011/0242686 A1 | 10/2011 | Watanabe | |
| 2011/0254790 A1* | 10/2011 | Suzuki | B32B 7/12 345/173 |
| 2011/0255301 A1* | 10/2011 | Watanabe | G02F 1/13336 362/558 |
| 2011/0285934 A1 | 11/2011 | Watanabe | |
| 2012/0008340 A1 | 1/2012 | Tomotoshi et al. | |
| 2012/0049718 A1 | 3/2012 | Watanabe et al. | |
| 2012/0300304 A1* | 11/2012 | Gollier | C03C 15/00 359/599 |
| 2013/0083080 A1 | 4/2013 | Rappoport et al. | |
| 2013/0235561 A1* | 9/2013 | Etienne | G02F 1/133308 362/97.1 |
| 2013/0258213 A1* | 10/2013 | Ek | G02F 1/1313 349/5 |
| 2013/0279177 A1* | 10/2013 | Moriwaki | G02F 1/13336 362/330 |
| 2013/0307826 A1* | 11/2013 | Ma | G06F 3/0428 345/175 |
| 2014/0009838 A1* | 1/2014 | Weber | G02B 3/08 359/615 |
| 2014/0176827 A1* | 6/2014 | Gollier | G02B 1/10 349/12 |

FOREIGN PATENT DOCUMENTS

| | | |
|---|---|---|
| EP | 2439582 | 11/2012 |
| JP | 60227232 | 11/1985 |
| JP | 2006139058 | 6/2006 |
| KR | 10-2000-020849 | 4/2000 |
| WO | 200242838 | 5/2002 |
| WO | 2009122691 | 10/2009 |
| WO | 2010055671 | 5/2010 |
| WO | 2010070871 | 6/2010 |
| WO | 2010122781 | 10/2010 |
| WO | 2011093243 | 8/2011 |

\* cited by examiner

MULTIPLE-ELEMENT LIGHT-BENDING STRUCTURES FOR MINIMIZING DISPLAY BORDERS

BACKGROUND

This relates generally to electronic devices, and more particularly, to electronic devices with displays.

Electronic devices often include displays. For example, cellular telephones and portable computers often include displays for presenting information to a user. An electronic device may have a housing such as a housing formed from plastic or metal. Components for the electronic device such as display components may be mounted in the housing.

It can be challenging to incorporate a display into the housing of an electronic device. Size and weight are often important considerations in designing electronic devices. If care is not taken, displays may be bulky or may be surrounded by overly large borders. The housing of an electronic device can be adjusted to accommodate a bulky display with large borders, but this can lead to undesirable enlargement of the size and weight of the housing and unappealing device aesthetics.

It would therefore be desirable to be able to provide improved displays for electronic devices.

SUMMARY

A display in an electronic device may have an array of display pixels that provide image light to a user. The display may be mounted within a housing for the electronic device.

The array of display pixels in the display may form an active display structure with a rectangular shape. The rectangular active display structure may be surrounded by an inactive display structure border region. Optical structures such as upper and lower optical structures may be configured to bend light from the display pixels that are located along the periphery of the active display structure so as to enlarge the effective size of the display.

The optical structures may include upper optical structures such as a sheet of glass or other optical member having curved edge surfaces for bending light from the display pixels. The optical structures may also include lower optical structures such as strips of glass with curved surfaces that surround an opening or other optical structures having curved surfaces. The lower optical structures may bend light from the display pixels located long the periphery of the active display pixels. The upper optical structures may then bend the light that has passed through the lower optical structures.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, and 3.

Figure 1:
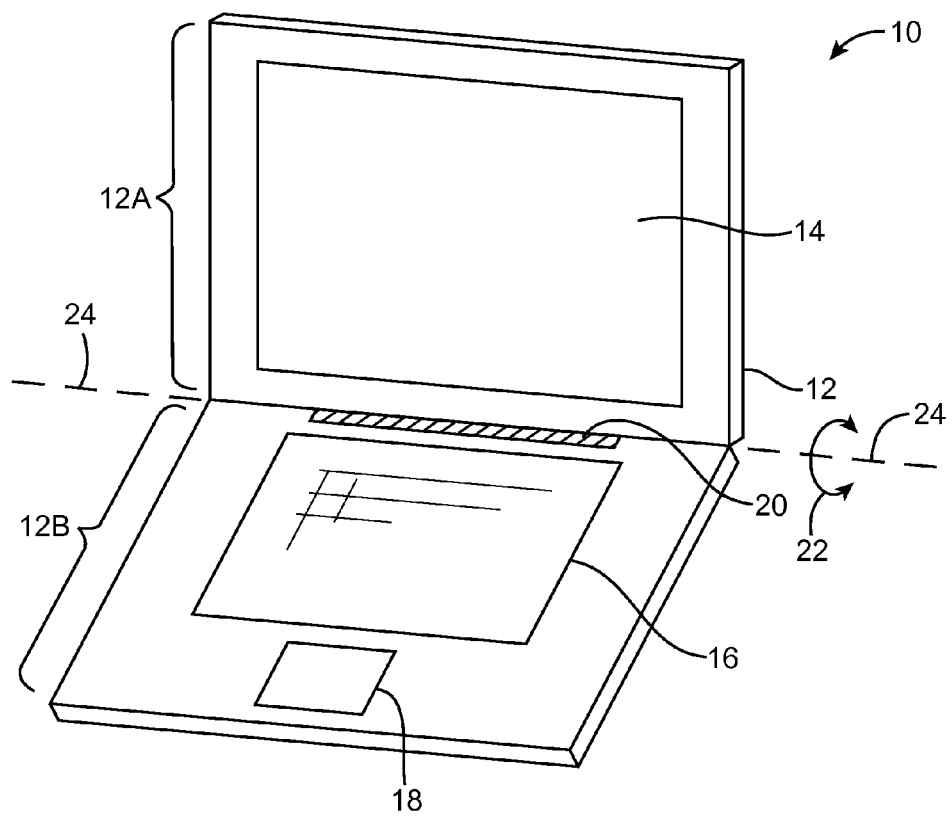
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
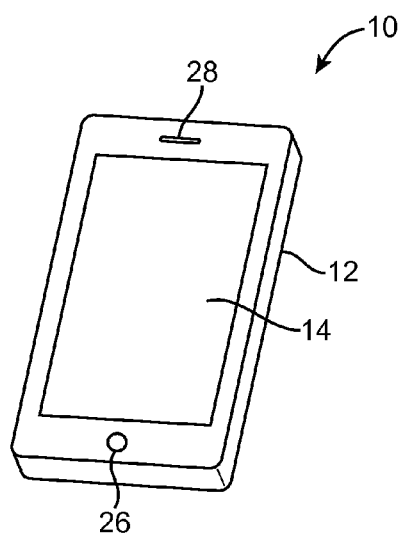
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 26. Openings may also be formed in a display cover layer or other display layer to accommodate a speaker port (see, e.g., speaker port 28 of FIG. 2).

Figure 3:
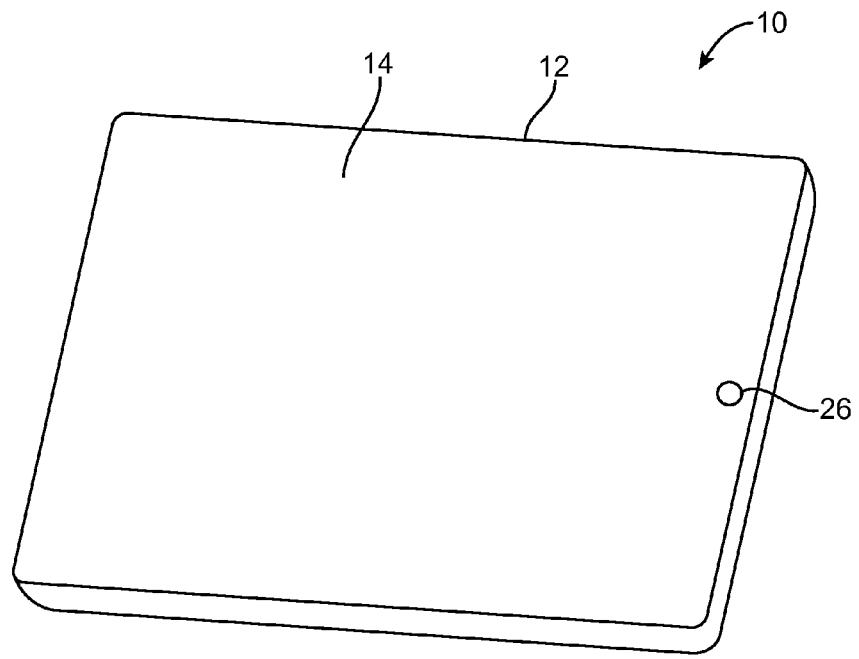
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have a cover layer or other external layer with an opening to accommodate button 26 (as an example).

The illustrative configurations for device 10 that are shown in FIGS. 1, 2, and 3 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Displays for device 10 may, in general, include image pixels formed from light-emitting diodes (LEDs), organic LEDs (OLEDs), plasma cells, electrowetting pixels, electrophoretic pixels, liquid crystal display (LCD) components, or other suitable image pixel structures. In some situations, it may be desirable to use LCD components to form display 14, so configurations for display 14 in which display 14 is a liquid crystal display are sometimes described herein as an example. It may also be desirable to provide displays such as display 14 with backlight structures, so configurations for display 14 that include a backlight unit may sometimes be described herein as an example. Other types of display technology may be used in device 10 if desired. The use of liquid crystal display structures and backlight structures in device 10 is merely illustrative.

A display cover layer may cover the surface of display 14 or a display layer such as a color filter layer or other portion of a display may be used as the outermost (or nearly outermost) layer in display 14. A display cover layer or other outer display layer may be formed from a transparent glass sheet, a clear plastic layer, or other transparent structures.

Touch sensor components such as an array of capacitive touch sensor electrodes formed from transparent materials such as indium tin oxide may be formed on the underside of a display cover layer, may be formed on a separate display layer such as a glass or polymer touch sensor substrate, or may be integrated into other display layers (e.g., substrate layers such as a thin-film transistor layer).

Figure 4:
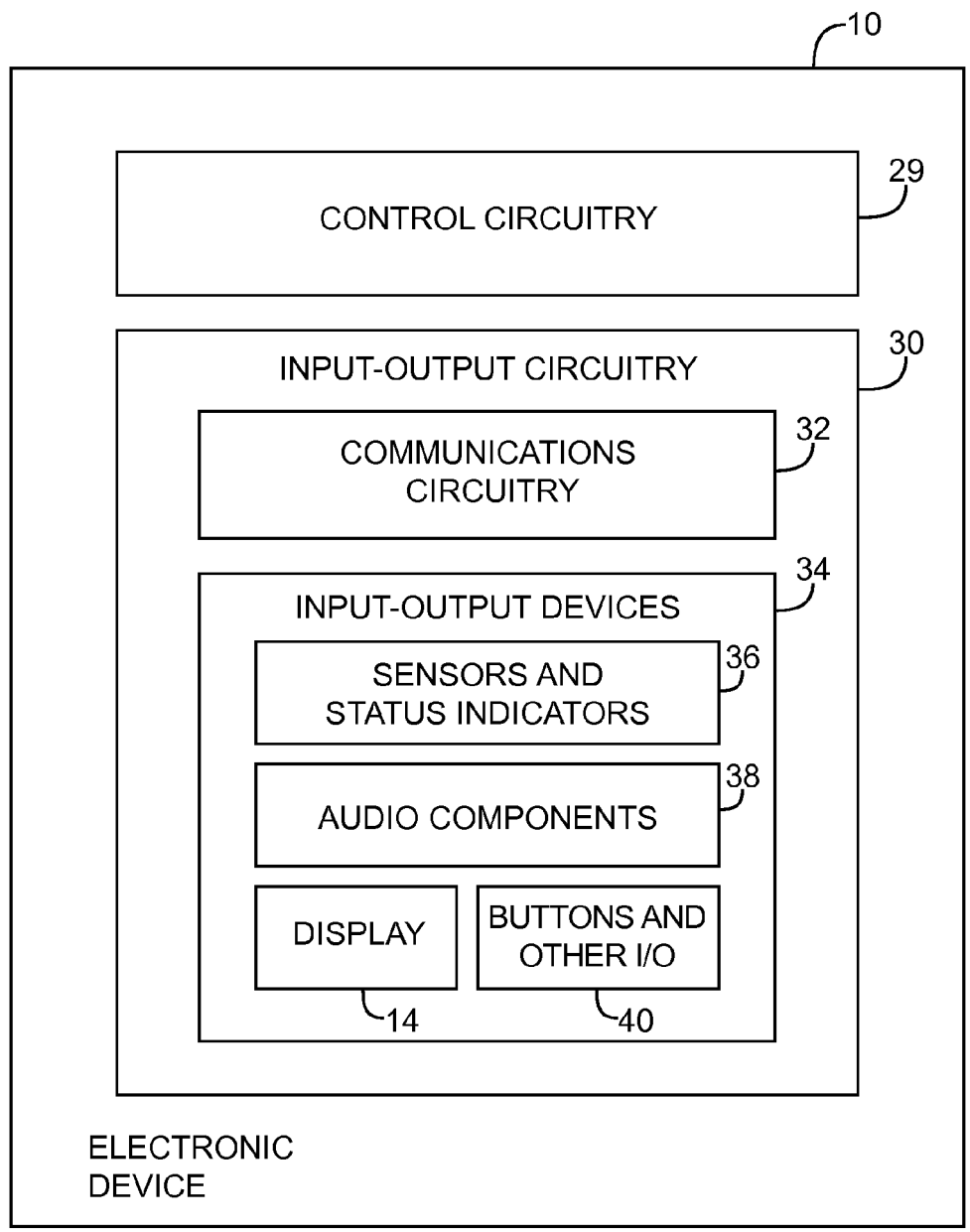
FIG. 4 is a schematic diagram of an illustrative electronic device with a display in accordance with an embodiment of the present invention.

A schematic diagram of an illustrative configuration that may be used for electronic device 10 is shown in FIG. 4. As shown in FIG. 4, electronic device 10 may include control circuitry 29. Control circuitry 29 may include storage and processing circuitry for controlling the operation of device 10. Control circuitry 29 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 29 may include processing circuitry based on one or more microprocessors, microcontrollers, digital signal processors, baseband processors, power management units, audio codec chips, application specific integrated circuits, etc.

Control circuitry 29 may be used to run software on device 10, such as operating system software and application software. Using this software, control circuitry 29 may present information to a user of electronic device 10 on display 14. Display 14 may contain an array of display pixels (e.g., liquid crystal display pixels) that are organized in rows and columns. Control circuitry 29 may be used to display content for a user of device 10 on the array of display pixels in display 14.

Input-output circuitry 30 may be used to allow data to be supplied to device 10 and to allow data to be provided from device 10 to external devices. Input-output circuitry 30 may include communications circuitry 32. Communications circuitry 32 may include wired communications circuitry for supporting communications using data ports in device 10. Communications circuitry 32 may also include wireless communications circuits (e.g., circuitry for transmitting and receiving wireless radio-frequency signals using antennas).

Input-output circuitry 30 may also include input-output devices 34. A user can control the operation of device 10 by supplying commands through input-output devices 34 and may receive status information and other output from device 10 using the output resources of input-output devices 34.

Input-output devices 34 may include sensors and status indicators 36 such as an ambient light sensor, a proximity sensor, a temperature sensor, a pressure sensor, a magnetic sensor, an accelerometer, and light-emitting diodes and other components for gathering information about the environment in which device 10 is operating and providing information to a user of device 10 about the status of device 10.

Audio components 38 may include speakers and tone generators for presenting sound to a user of device 10 and microphones for gathering user audio input.

Display 14 (e.g., the array of display pixels in display 14) may be used to present images for a user such as text, video, and still images. Sensors 36 may include a touch sensor array that is formed as one of the layers in display 14.

User input may be gathered using buttons and other input-output components 40 such as touch pad sensors, buttons, joysticks, click wheels, scrolling wheels, touch sensors such as sensors 36 in display 14, key pads, keyboards, vibrators, cameras, and other input-output components.

Figure 5:
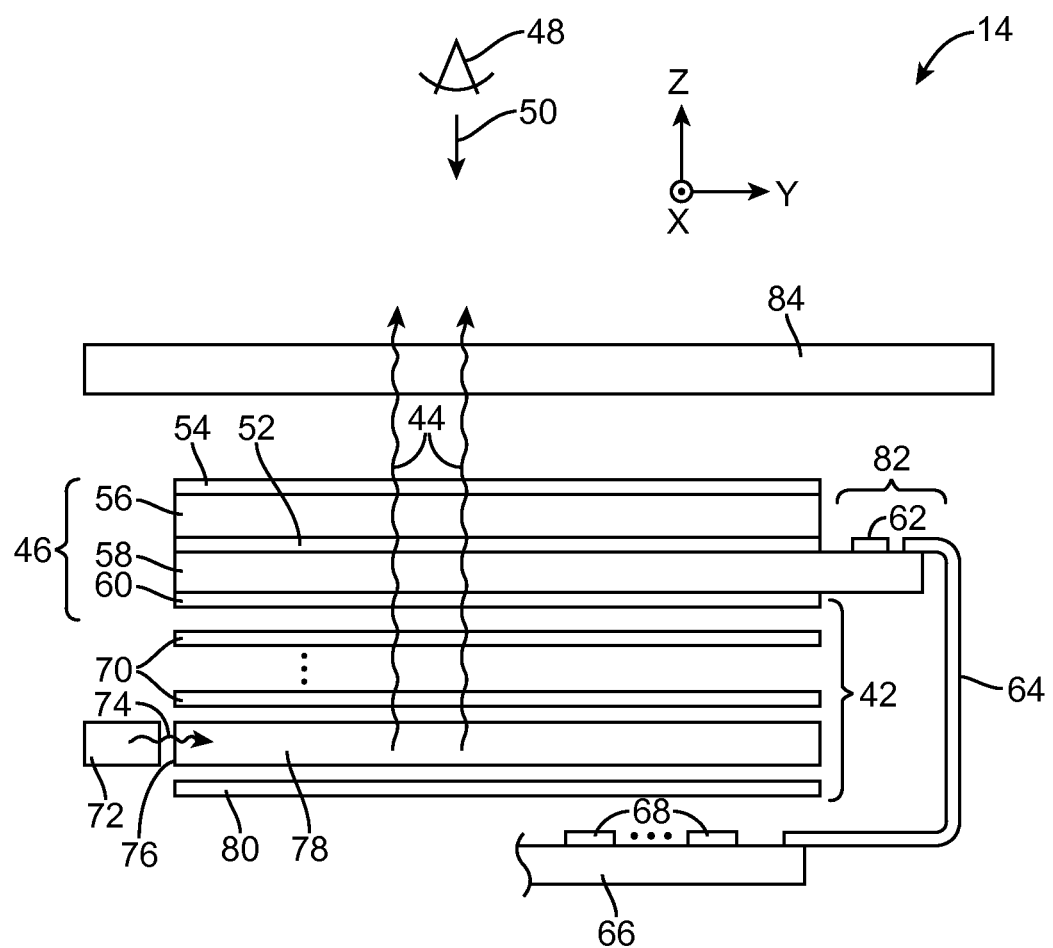
FIG. 5 is a cross-sectional side view of an illustrative display in accordance with an embodiment of the present invention.

A cross-sectional side view of an illustrative configuration that may be used for display 14 of device 10 (e.g., for display 14 of the devices of FIG. 1, FIG. 2, or FIG. 3 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display 14 may, if desired, have one or more optical structures that are located above display layers 46. For example, display 14 may have a display cover layer such as display cover layer 84. Display cover layer 84 may be formed from a layer of clear glass, a transparent sheet of plastic, or other transparent structure. Display cover layer 84 may be mounted in housing 12 (e.g., using housing sidewalls). During operation, light 44 may pass through the array of display pixels formed from display layers 46 and display cover layer 84 for viewing by user 48.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types. Display layers 46 may sometimes be referred to as a display module, a display, or an array of display pixels. The image light (light 44) that passes through the array of display pixels is used in displaying content on display 14 for user 48.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry 29 (e.g., one or more integrated circuits such as components 68 on printed circuit 66 of FIG. 5) may be used to generate information to be displayed on display (e.g., display data). The information to be displayed may be conveyed from circuitry 68 to display control circuitry such as display driver integrated circuit 62 using a signal path such as a signal path formed from conductive metal traces in flexible printed circuit 64 (as an example).

Display driver integrated circuit 62 may be mounted on thin-film-transistor layer driver ledge 82 or elsewhere in device 10. During operation of display 14, display driver circuitry 62 and/or other display control circuitry such as gate driver circuitry formed on substrate 58 or coupled to substrate 58 may be used in controlling the array of display pixels in layers 46 (e.g., using a grid of vertical data lines and horizontal gate lines).

A flexible printed circuit cable such as flexible printed circuit 64 may be used in routing signals between printed circuit 66 and thin-film-transistor layer 58. If desired, display driver integrated circuit 62 may be mounted on printed circuit 66 or flexible printed circuit 64. Printed circuit 66 may be formed from a rigid printed circuit board (e.g., a layer of fiberglass-filled epoxy) or a flexible printed circuit (e.g., a flexible sheet of polyimide or other flexible polymer layer).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint. Display layers 46 and the other display structures of FIG. 5 typically have rectangular shapes with four peripheral edges, but display configurations with other shapes may be used in forming display 14 if desired.

Figure 6:
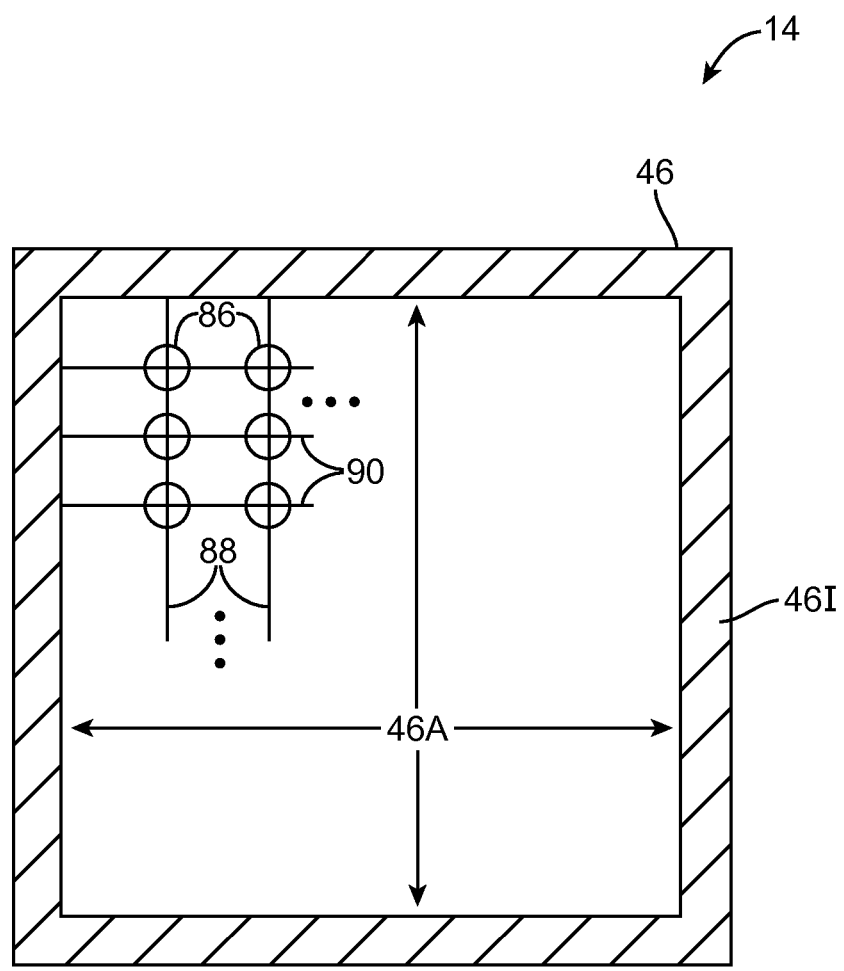
FIG. 6 is a top view of illustrative display layers in a display having an active region with an array of display pixels and an inactive border region in accordance with an embodiment of the present invention.

As shown in FIG. 6, display structures 46 of display 14 may include a plurality of display pixels 86. Display pixels 86 may be organized in rows and columns. Display control circuitry may be used in controlling the operation of display pixels 86 using signal lines such as data lines 88 and gate lines 90. In liquid crystal displays, display pixels 86 may each contain an electrode for applying an electric field to an associated portion of liquid crystal layer 52 (FIG. 5) and a thin-film (amorphous silicon or polysilicon) transistor for controlling the magnitude of the signal applied to the electrode and therefore the magnitude of the electric field. In other types of displays, display pixels 86 may be formed from other types of structures (e.g., organic light-emitting diodes, etc.).

Lines 90 may be coupled to the gates of the thin-film transistors and may sometimes be referred to as gate lines. Lines 88 may be coupled to the sources of the thin-film transistors and may sometimes be referred to as source lines or data lines. Gate driver circuitry (e.g., thin-film transistor gate driver circuitry) may be coupled to gate lines 90. Display driver circuitry that produces data signals for lines 88 (e.g., a display driver integrated circuit) may be coupled to data lines 88.

Gate driver circuitry, one or more display driver integrated circuits, traces for distributing gate and data signals and other display control signals, and other display control circuitry may be formed in inactive region 46I of display 14 and display structures 46. As an example, a display driver integrated circuit may be mounted along the upper segment of inactive region 46I, whereas gate driver thin-film circuitry may be formed along the left and right segments of inactive region 46I. During operation of display 14, display pixels 86 may display images for a user, so the portion of display structures 46 containing display pixels 86 may sometimes be referred to as active display structures or the active area of display 14. The metal traces and other display control circuit structures in inactive region 46I do not display any images, so this portion of structures 46 may sometimes be referred to as inactive display structures.

Inactive region 46I may form a border that surrounds some or all of active area 46A. For example, inactive region 46I may have a rectangular ring shape of the type shown in FIG. 6 having opposing upper and lower border segments and left and right border segments. To provide display 14 with a borderless appearance, display 14 may be provided with optical structures such as glass layers and other structures with curved or angled surfaces. The optical structures may be configured to bend and therefore guide light that is emitted from the array of display pixels 86 in active area 46A into a portion of display 14 that overlaps inactive area 46I. By using optical structures to bend light from active area 46A, content may be displayed in portions of display 14 that overlap inactive regions 46I, providing display 14 with a borderless or near borderless appearance.

The optical structures that are used to enhance the apparent size of display 14 may be formed from transparent materials such as clear glass or plastic structures. As an example, the optical structures may be formed from sheets of clear glass or plastic material or from glass, plastic, or other transparent material of other shapes. Optical structures with curved and angled surfaces for bending light may be formed using molding equipment, slumping equipment, machining equipment, or other tools for shaping clear material.

Figure 7:
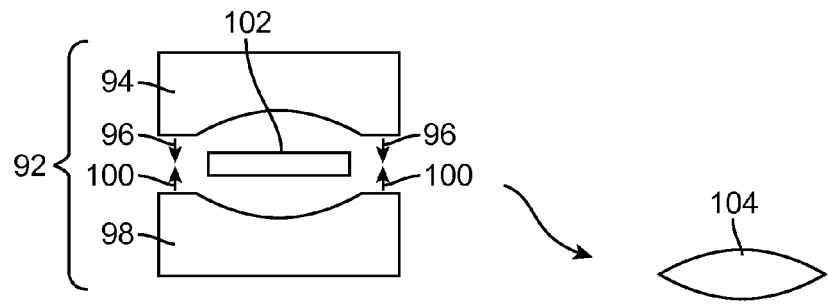
FIG. 7 is a diagram showing how a mold may be used to form display structures such as glass structures with curved surfaces in accordance with an embodiment of the present invention.

FIG. 7 is a diagram showing how a mold may be used to form optical structures with curved surfaces for bending light in display 14. As shown in FIG. 7, molding equipment 92 may include mold structures such as upper mold structures 94 and lower mold structures 98. Structures such as mold structures 94 and 98 may be heated. Optical material 102 (e.g., glass, plastic, ceramic, etc.) may be molded between the opposing surfaces of mold structures 94 and 98 (e.g., when upper mold structure 94 is moved in direction 96 and/or when lower mold structures 98 is moved in direction 100). If desired, molding operations may also involve injection molding techniques. By molding material 102 with molding equipment 92, optical structures 104 that have curved or angle surfaces may be formed.

Figure 8:
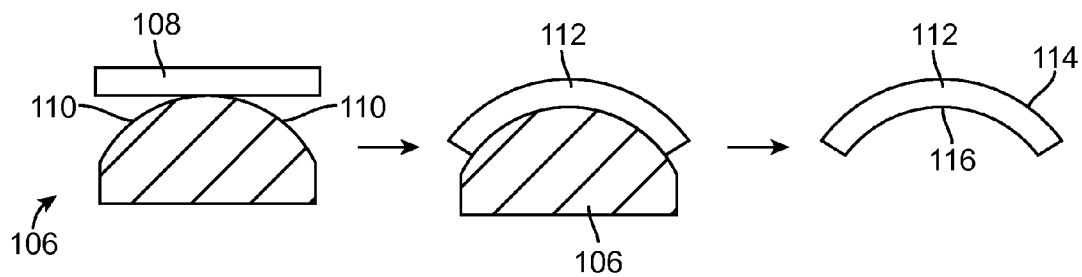
FIG. 8 is a diagram showing how a slumping process may be used to form display structures such as glass structures with curved surfaces in accordance with an embodiment of the present invention.

As shown in the illustrative configuration of FIG. 8, a slumping process may be used in forming optical structures with curved surfaces for bending light in display 14. Slumping equipment 106 may include a heated metal structure or other equipment with exposed curved surfaces such as curved surface 110. Optical material 108 (e.g., glass, plastic, ceramic, etc.) may be placed on top of surface 110 while slumping equipment 106 is heated. When equipment 106 reaches a sufficiently high temperature, optical material 108 will slump under its own weight, thereby creating optical structures with curved surfaces such as optical structures 112. Following cooling, structures 112 may be removed from slumping equipment 106. As shown on the right-hand side of FIG. 8, the resulting shape for optical structures 112 may have curved surfaces such as curved upper surface 114 and curved lower surface 116.

Figure 9:
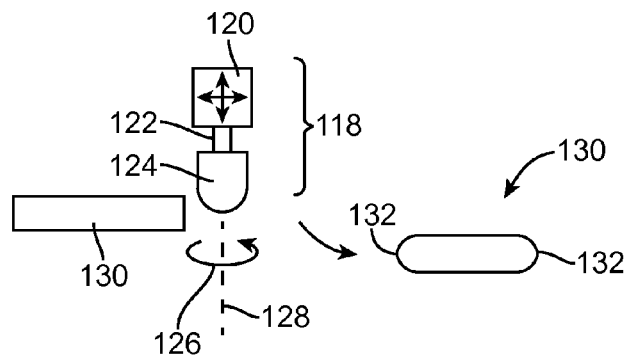
FIG. 9 is a diagram showing how a machining process may be used to form display structures such as glass structures with curved surfaces in accordance with an embodiment of the present invention.

FIG. 9 is a diagram showing how a machining process may be used to form display structures such as glass structures with curved surfaces. As shown in FIG. 9, optical material 130 may be processed using machining equipment 118. Machining equipment 118 may have a machining head such as head 124 (e.g., a drill bit, milling cutter, or other machining tool). Actuator 120 may use shaft 122 to rotate head 124 in direction 126 about rotational axis 128. Actuator 120 may include a motor for rotating shaft 122 and computer-controlled positioners for adjusting the location of shaft 122 and head 124 relative to optical material 130. Following machining of the edges or other portions of optical structures 130, optical structures 130 may have curved surfaces such as curved surfaces 132, as shown on the right-hand side of FIG. 9.

By providing optical structures in display 14 with curved edges or other curved or angled surfaces, the optical structures may bend light that is emitted from display pixels 86 in a way that allows the light to extend laterally outward over the otherwise inactive portions of the display. As a result, it will appear to a user of the display as if the display is borderless or nearly borderless.

To provide satisfactory light bending within tight spaces in device 10, it may be desirable to use multiple layers of light-bending structures. For example, optical structures for bending light for display 14 may include a first set of structures (e.g., an optical member or other optical structures formed from glass, plastic, or ceramic) that are located lower in display 14 (i.e., closer to display structures 46) and a second set of structures (e.g., an optical member or other optical structures formed from glass, plastic, or ceramic) that is located higher in display 14 (i.e., farther from display structures 46 and closer to viewer 48).

Figure 10:
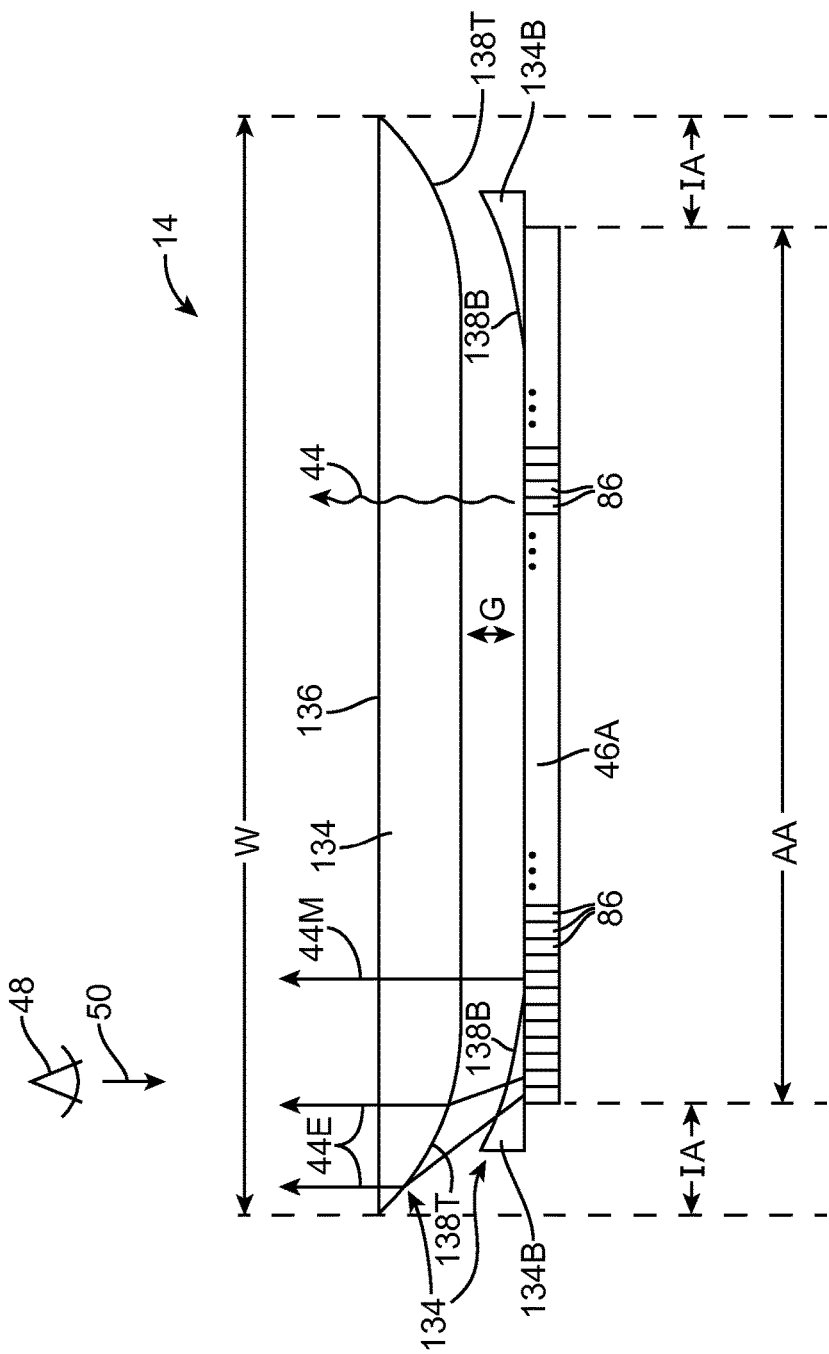
FIG. 10 is a cross-sectional side view of an illustrative display having optical structures for bending light produced by an array of display pixels and thereby creating a borderless appearance for the display in accordance with an embodiment of the present invention.

An illustrative display of the type that may use curved optical structures to achieve a borderless or near borderless appearance to a viewer is shown in FIG. 10. As shown in the cross-sectional side view of display 14 in FIG. 10, display 14 may include active area display layers such as active display structures 46A. Inactive display structures such as inactive display structures 46I of FIG. 6 that surround the periphery of active display structures 46A are not shown.

Active area display structures 46A may contain a rectangular array of display pixels such as display pixels 86 with a rectangular peripheral edge. Light rays 44 associated with display pixels 86 may be produced by a backlight unit (e.g., a backlight unit in a display such as a backlit liquid crystal display), may be produced by light reflected off of a reflector such as reflector 80 of FIG. 5, or may be emitted by light-emitting diode structures or other light sources within display pixels 86.

Optical structures 134 (e.g., optical structures of the type formed using the equipment of FIGS. 7, 8, and 9 or other equipment) may be formed from transparent optical members. For example, a display may be provided with transparent structures formed from glass, plastic, ceramic, or other clear material. Optical structures 134 may include multiple layers of structures such as optical structures 134T and optical structures 134B. Optical structures 134T may be located farther from active display structures 46A and closer to viewer 48 than optical structures 134B, so optical structures 134T may sometimes be referred to as upper or outer optical structure and optical structures 134B may sometimes be referred to lower or inner optical structures.

Optical structures 134T and 134B of FIG. 10 may have planar surfaces such as upper surface 136 of structures 134T. Structures 134T may be formed from a sheet of material such as glass, polymer, or ceramic. As shown in FIG. 10, optical structures 134 and may have curved or angled surfaces such as curved surfaces 138T on upper optical structures 134T and curved surfaces 138B on lower optical structures 134B.

Curved surfaces may be located on the upper and/or lower sides of optical structures 134T and 134B. For example, in a rectangular display having top, bottom, left, and right edges, curved surfaces such as surfaces 138T and/or 138B may be formed along the right and left edges or may run around the entire periphery of the display (e.g., along the right, left, top, and bottom edges when viewed in direction 50 by viewer 48).

Curved and angled surfaces in optical structures 134B and 134T may allow optical structures 134B and 134T to serve as light bending structures to bend light 44 from active display structures 46A so that the entire lateral expanse of display 14 appears to be filled with active image content. Display 14 may, for example, appear to have no left and right borders (when viewed in direction 50) and/or may additionally have no upper and lower borders (when viewed in direction 50). The lateral dimensions (in X and Y) for active display structures 46A are less than the respective lateral dimensions X and Y of upper optical structures 134T, so the area of structures 134T is greater than the area of active display structures 46A and the apparent image size for display 14 is enlarged. By enlarging the apparent size of the display, the display may be made to appear borderless or nearly borderless, even if active display structures 46A are surrounded by a border of inactive structures such as structures 46B.

Rays of light from active display structures 46A such as light ray 44M are produced by display pixels 86 that are near to the center of display 14. In this portion of display 14, light may travel vertically upwards to viewer 48 without significant bending. Light 44 in the center of display 14 may, for example, travel through a central opening in optical structures 134B and may travel through planar or nearly planar portions of optical structures 134T. Near to the peripheral edges of active display structures 46A, however, light rays such as light rays 44E are emitted that are bent by the curved (angled) nature of the edges of optical structures 134B and 134T (e.g., surfaces 138B and 138T).

As shown by the bent trajectory of light rays 44E, light rays 44E that are emitted by display pixels 86 along the edges of active display structures 46A may, upon passing through optical structures 134B and being bent by optical structures 134B and upon passing through optical structures 134T and being further bent by optical structures 134T, appear to viewer 48 as if they were emitted by display pixels located in inactive border region IA. The lateral extent (e.g., width W in FIG. 10) of display 14 over which light rays 44 are emitted and therefore the effective size of display 14 for displaying content to viewer 48 is enhanced by the presence of curved portions 138B and 138T of optical structures 134B and 134T, so that it appears as if display 14 has an active area of lateral dimension W, rather than the more limited size of active area AA that is associated with the physical size of the array of display pixels 86 in structures 46A.

The use of multiple layers of optical structures in display 14 such as lower structures 134B and upper structures 134T (and if desired one or more additional layers of light bending optical structures 134) allows structures 134 to efficiently and accurately guide light 44. Lower structures 134B perform some light bending and, following passage through a gap such as air gap G or a gap filled with a clear material such as a polymer that allows rays 44E to spread out from each other, upper structures 134T may perform additional light bending. Using the light bending capabilities of structures 134B and 134T in this way, surface 136 can be entirely covered with active display pixel content (e.g., graphics, text, video, etc.), providing display 14 with a borderless or nearly borderless appearance, despite the presence of display control circuitry and other inactive structures in inactive region 46I of display structures 46 (FIG. 6).

As shown in the illustrative example of FIG. 10, optical structures 134B may have a central opening overlapping the center of active display structures 46A. Light rays such as rays 44M may pass through this opening. Optical structures 134B may also have curved surfaces 138B that are located on the upper surface of structures 134B near the peripheral edge of display structures 46A. Structures 134B may have a rectangular outline (shape) when viewed in direction 50 (i.e., structures 134B may be formed from a rectangular ring-shaped member of optical material or other optical structures with curved edge surfaces). One or more, two or more, three or more, or four of the edges of rectangular optical structures 134B may be provided with curved surfaces such as surfaces 138B. Upper optical structures 134T may be formed from a glass member such as a sheet of glass with one or more curved or angled surfaces, a ceramic or plastic member with one or more curved or angled surfaces, or other optical structures configured to bend light 44E.

Figure 11:
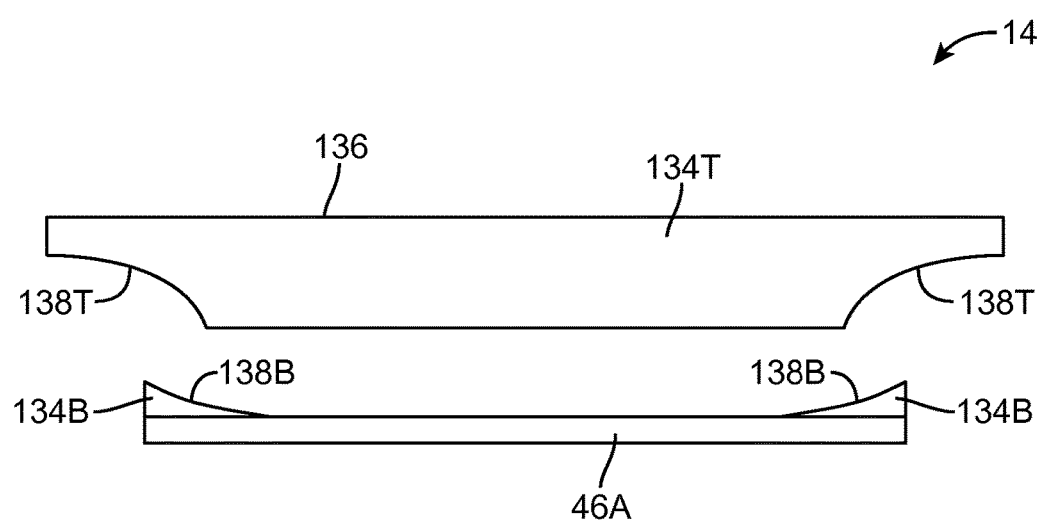
FIG. 11 is a cross-sectional side view of an illustrative display having upper optical structures with a concave edge portion and lower optical structures for bending light produced by an array of display pixels and thereby creating a borderless appearance for the display in accordance with an embodiment of the present invention.

FIG. 11 shows how the lower surface of optical member 134T may, if desired, be provided with a concave curved surface shape. Upper surface 136 of optical member 134T may be planar. The lower surface of optical structures 134B in this type of configuration may be planar and may lie against the planar upper surface of structures 46A (as an example). Upper surfaces 138B of lower optical structures 134B may be angled or curved (as examples). An opening (e.g., a rectangular opening) may be formed in the center of optical structures 134B.

Figure 12:
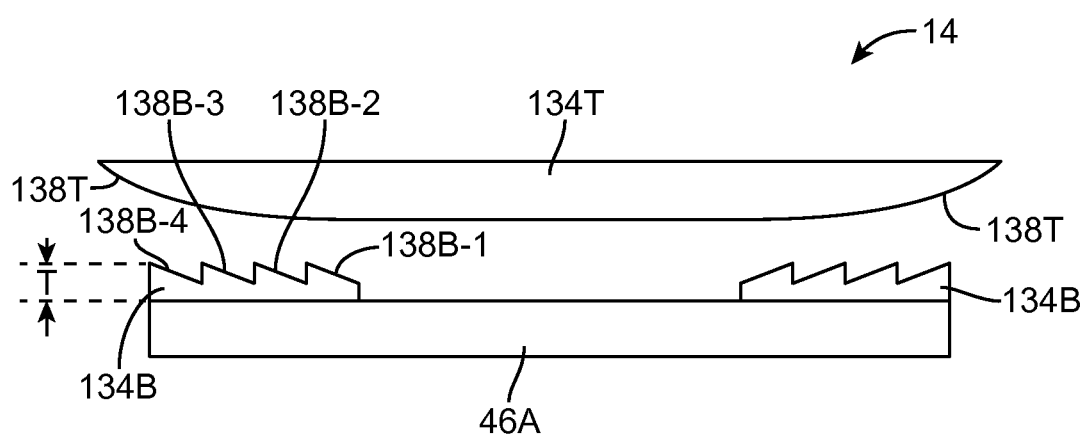
FIG. 12 is a cross-sectional side view of an illustrative display having upper optical structures with curved lower surfaces and lower optical structures such as Fresnel lens structures for bending light produced by an array of display pixels and thereby creating a borderless appearance for the display in accordance with an embodiment of the present invention.

If desired, optical structures such as optical structures 134B and 134T may include Fresnel lenses. As shown in FIG. 12, for example, lower optical structures 134B may be Fresnel lens structures having Fresnel lens sections that form respective curved or angled surfaces such as surfaces 138B-1, 138B-2, 138B-3, and 138B-4. Fresnel lens structures may be used to bend light in display 14, as described in connection with optical structures 134B of FIG. 10. The thickness T of Fresnel lens structures such as optical structures 134B of FIG. 12 may be thinner than comparable light-bending structures that are not based on Fresnel lens structures, allowing the thickness of display 14 to be minimized.

Figure 13:
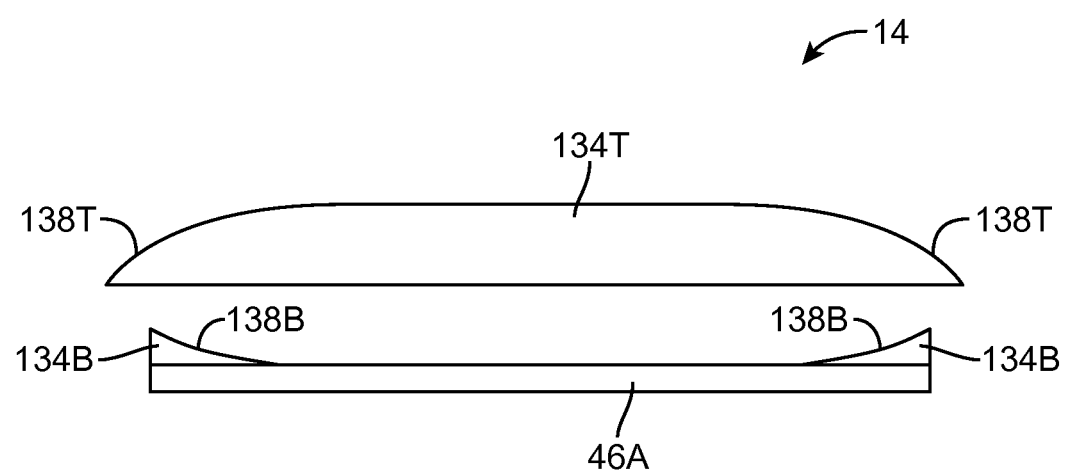
FIG. 13 is a cross-sectional side view of an illustrative display having upper optical structures with curved upper surfaces and lower optical structures with curved upper surfaces for bending light produced by an array of display pixels and thereby creating a borderless appearance for the display in accordance with an embodiment of the present invention.

In the configuration of FIG. 13, display 14 has been provide with upper optical structures 134T that have an upper surface with a planar central region and curved peripheral edge portions 138T. The lower surface of optical structures 134T may be planar. Lower optical structures 134B may have curved upper surfaces 138B.

Optical structures 134B may be mounted against active display structures 46A or may be mounted so that an air gap or a gap filled with materials other than air such as solidified liquid polymer is formed between optical structures 134B and active display structures 46A. An air gap or a gap filled with materials other than air such as solidified liquid polymer may also be formed between the lower surface of upper optical structures 134T and the upper surface of lower optical structures 134B.

Figure 14:
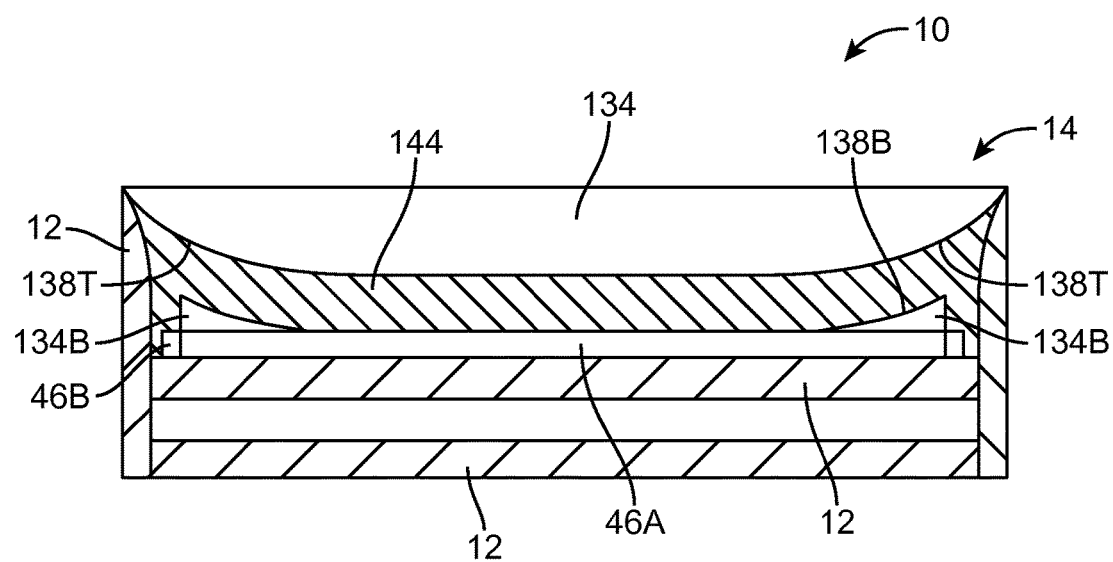
FIG. 14 is a cross-sectional side view of an illustrative display with a solidified liquid polymer layer for supporting upper and lower optical structures configured to bend light produced by an array of display pixels and thereby create a borderless appearance for the display in accordance with an embodiment of the present invention.

FIG. 14 is a cross-sectional side view of display 14 in a configuration in which optical structures 134B have been mounted so that there is no air gap between the lower surfaces of optical structures 134B and the upper surface of active display structures 46A and so that clear material such as solidified liquid polymer 144 has been formed in the gap between upper optical structures 134T and the upper surfaces of optical structures 134B and active display structures 46A. Polymer layer 144 may be used to help attach upper optical structures 134T to device 10.

Polymer material 144 may be formed from a cured optical adhesive (e.g., optically clear adhesive). Optical structures 134B may be attached to display structures 46A using adhesive (as an example). Polymer 144 (e.g., uncured liquid polymer) may be placed on top of display structures 46A and 134B by dripping, screen printing, spraying, or other suitable techniques. Optical structures 134T may then be placed on top of the liquid polymer. Ultraviolet light curing or thermal curing techniques may then be used to cure the polymer material to form solid polymer support structures such as structures 144 of FIG. 14. Polymer layer 144 may have an index of refraction of 1.1 to 1.3 or less than 1.3 (as examples). Optical structures 134 may have an index of refraction of 1.4 to 1.8 or 1.3 to 1.7 (as examples).

If desired, device 10 may be provided with touch sensor functionality. A touch sensor for device 10 may be implemented using an array of capacitive touch sensor electrodes (e.g., transparent conductive electrodes such as indium tin oxide electrodes), may use resistive touch technology, light-based touch sensors, acoustic touch sensor technology, or other touch sensor technology. As an example, a capacitive touch sensor for device 10 may be implemented using a one-sided or two-sided array of indium tin oxide electrodes. The electrodes may be formed on a touch sensor substrate such as a layer of glass or plastic that is separate from other layers in display 14 (e.g., a touch sensor substrate that is mounted within display 14 using adhesive) or may be formed on the surface of optical structures 134T, a display cover layer that is located above structures 134T, optical structures 134B, display structures 46, or other structures in display 14.

Figure 15:
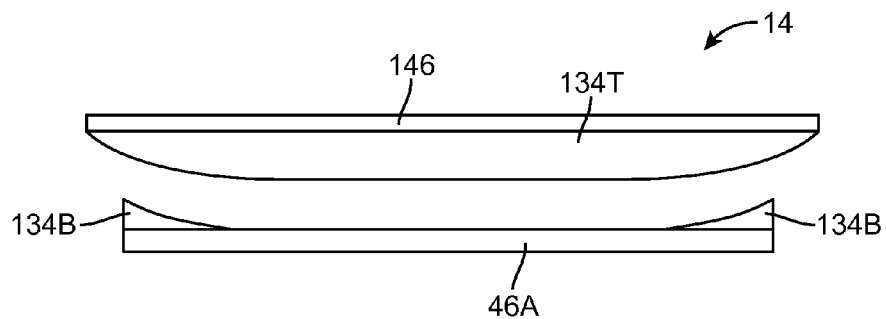
FIG. 15 is a cross-sectional side view of an illustrative display having upper and lower optical structures for bending light and having a touch sensor on an upper surface of the upper optical structures in accordance with an embodiment of the present invention.

FIG. 15 is a cross-sectional side view of display 14 in a configuration in which touch sensor 146 has been formed on the upper surface of optical structures 134T. An air gap or polymer-filled gap may separate optical structures 134T from display structures 46A and optical structures 134B. Touch sensor 146 may include capacitive touch sensor structures such as a one-layer or two-layer array of indium tin oxide electrodes. The indium tin oxide electrodes or other touch sensor structures for touch sensor 146 may be formed directly on the upper surface of optical structures 134T or may be formed on a substrate (e.g., a sheet of glass or polymer) that is attached to the surface of optical structures 134T by adhesive (as examples).

Figure 16:
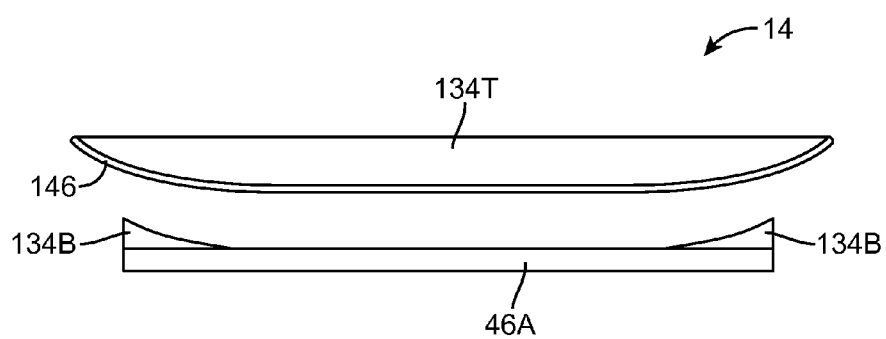
FIG. 16 is a cross-sectional side view of an illustrative display having upper and lower optical structures for bending light and having a touch sensor on a lower surface of the upper optical structures in accordance with an embodiment of the present invention.

In the illustrative configuration of FIG. 16, touch sensor 146 has been formed on the lower surface of optical structures 134T (directly or by attaching a touch panel substrate with electrodes to the lower surface of structures 134T using adhesive). An air gap or a gap filled with polymer 144 may be interposed between touch sensor 146 and display structures 46A and optical structures 134B.

Figure 17:
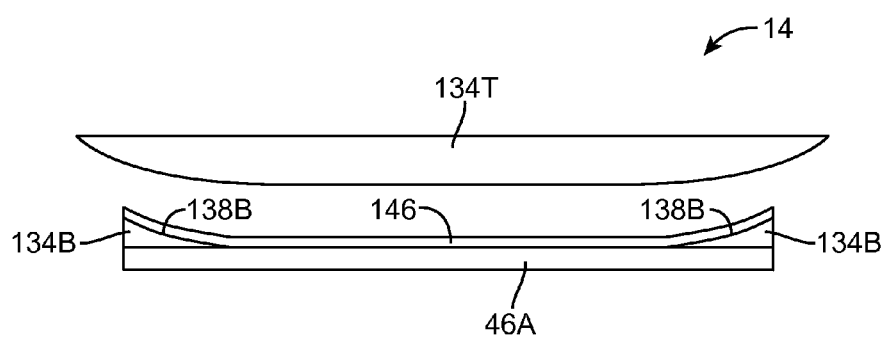
FIG. 17 is a cross-sectional side view of an illustrative display having upper and lower optical structures for bending light and having a touch sensor on an upper surface of the lower optical structures in accordance with an embodiment of the present invention.

FIG. 17 is a cross-sectional side view of display 14 in a configuration in which touch sensor 146 has been formed on the upper surface of display structures 46A and upper surfaces 138B of lower optical structures 134B. Touch sensor 146 may, for example, be formed on a flexible substrate such as a sheet of polymer that is attached to the upper surface of display structures 46A and the upper surfaces of optical structures 134B by adhesive. Touch sensor structures may also be formed on structures 46A and 134B using physical vapor deposition or other deposition techniques (e.g., to form patterned indium tin oxide electrodes, etc.). An air gap or a gap filled with polymer 144 may be interposed between touch sensor 146 and structures 134T.

Figure 18:
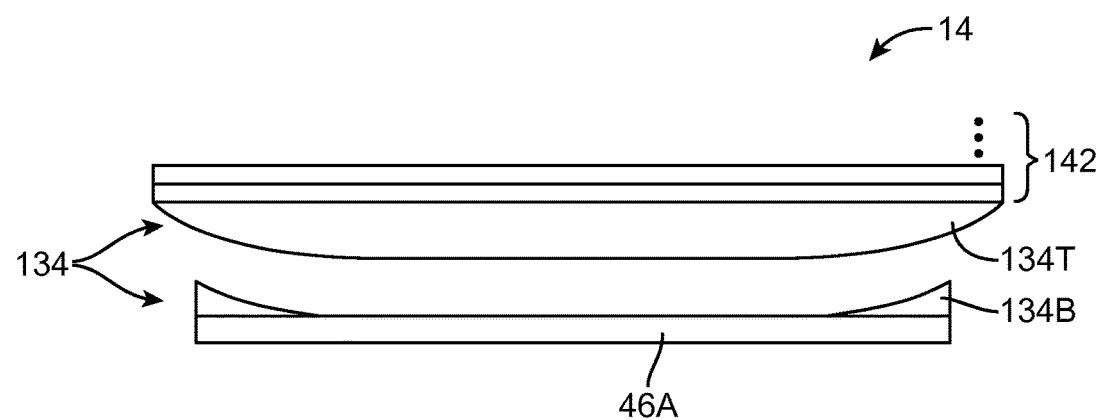
FIG. 18 is a cross-sectional side view of an illustrative display having upper and lower optical structures for bending light and having coating layers on an upper surface of the upper optical structures in accordance with an embodiment of the present invention.

As shown in FIG. 18, optical structures 134 in display 14 such as upper optical structures 134T and lower optical structures 134B may be provided with optical coating layers such as layers 142. In the example of FIG. 18, the upper surface of upper optical structures 134T have been coated with coating layers 142. This is merely illustrative. The upper and/or lower surfaces of upper optical structures 134T may be provided with coating layers 142, the upper and/or lower surfaces of lower optical structures 134T may be provided with coating layers 142, and/or both optical structures 134T and 134B may have one or more surfaces covered with coating layers 142.

Layers 142 may be formed from dielectrics such as sputtered oxides, from clear materials deposited using physical vapor deposition, chemical vapor deposition, or other deposition techniques (e.g., coatings of glass, polymer, ceramic, or other materials), or may be formed from other transparent coating layers on optical structures 134. There may be one or more layers 142, two or more layers 142, three or more layers 142, or four or more layers 142. Layers 142 may include layers such as antireflection layers (e.g., dielectric stacks with alternating high-index-of-refraction and low-index-of-refraction layers), antismudge layers, antiscratch layers, or other layers to modify the properties of the upper and/or lower surface of optical structures 134. An air gap or a gap filled with polymer 144 may separate the lower surface (coated or uncoated with layers 142) of upper optical structures 134T from the upper surface (coated or uncoated with layers 142) of lower optical structures 134B and touch sensor 146 of FIG. 18.

Figure 19:
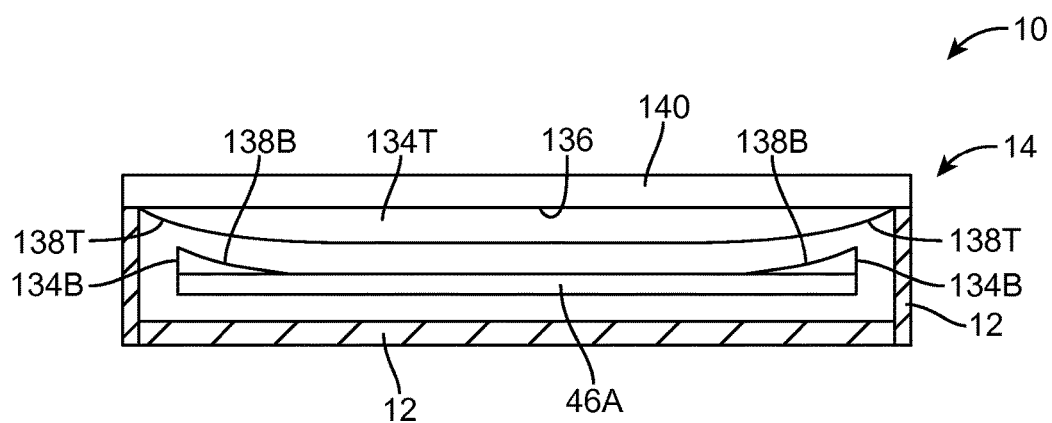
FIG. 19 is a cross-sectional side view of an illustrative display having upper and lower optical structures for bending light and having a planar display cover layer that covers the upper and lower optical structures in accordance with an embodiment of the present invention.

In the illustrative configuration of FIG. 19, optical structures 134 such as upper optical structures 134T have been covered with a layer of transparent material such as display cover layer 140. Display cover layer 140 may be a planar sheet of glass, plastic, ceramic, or other transparent material having opposing planar upper and lower surfaces. Optical structures 134T may have a planar upper surface such as upper surface 136. Upper surface 136 may be coplanar with the planar lower surface of display cover layer 140. Display cover layer 140 may, if desired, by coupled to optical structures 134T using a layer of adhesive. Coating layers 142 may, if desired, be formed on the upper and/or lower surface of display cover layer 140. A touch sensor such as touch sensor 146 may be interposed between the lower surface of display cover layer 140 and the upper surface of upper optical structures 134T.

Lower structures 134B may have curved or angled edge surfaces 138B that lie in planes that are not coplanar with upper surface 136 to allow the edges of optical structures 134B to bend light from display structures 46A. Light may also be bent by the curved or angled surfaces of display structures 134T such as surfaces 138T. Air gaps or gaps filled with polymer 144 may separate display cover layer 140, optical structures 134T, optical structures 134B, and/or display structures 46A of FIG. 20.

The foregoing is merely illustrative of the principles of this invention and various modifications can be made by those skilled in the art without departing from the scope and spirit of the invention.

What is claimed is:

1. A display for displaying content with an apparent size to a user, the display comprising:
    active display structures having an area, wherein the active display structures include an array of display pixels;
    upper optical structures having an area larger than the area of the active display structures;
    lower optical structures that are interposed between the active display structures and the upper optical structures, wherein the lower optical structures are directly adjacent to the active display structures, wherein the lower optical structures are configured to redirect light from at least some of the active display structures, wherein the upper optical structures have a planar upper surface and a lower surface with curved edge surfaces that are configured to redirect light that has passed though the lower optical structures to make the apparent size of the display larger than the area of the active display structures, wherein the lower optical structures comprise curved surfaces that redirect the light, wherein the lower optical structures have a central opening over the active display structures through which light passes from a portion of the array of display pixels without being redirected by the lower optical structures, and wherein the curved surfaces of the lower optical structures are concave and the curved edge surfaces of the upper optical structure are convex; and
    a touch sensor that is interposed between the upper optical structures and the lower optical structures.

2. The display defined in claim 1 further comprising a coating on the upper optical structures.

3. The display defined in claim 2 wherein the coating comprises an antireflection coating.

4. The display defined in claim 3 wherein the array of display pixels is an array of liquid crystal display pixels.

5. The display defined in claim 1 wherein the array of display pixels has a rectangular periphery and wherein the lower and upper optical structures are configured to redirect light from display pixels in the array of display pixels that are located along the rectangular periphery.

6. The display defined in claim 5 further comprising a display cover layer that overlaps the upper optical structures.

7. The display defined in claim 1 further comprising:
    a glass display cover layer that overlaps the upper optical structures.

8. The display defined in claim 1 wherein the lower optical structures comprise Fresnel lens structures.

9. The display defined in claim 1, wherein the lower optical structures have a lower surface, wherein the lower surface is entirely planar, and wherein the lower surface directly contacts the active display structures.

10. The display defined in claim 1, wherein the active display structures include a liquid crystal layer interposed between first and second transparent substrate layers, wherein the lower optical structures comprise a planar surface that opposes the curved surfaces, wherein the first transparent substrate layer has a planar surface, and wherein the planar surface of the lower optical structures is parallel to the planar surface of the first transparent substrate layer.

11. An electronic device, comprising:
    a housing;
    a display in the housing, wherein the display has active display structures that include an array of display pixels having an area with a rectangular shape and a peripheral edge;
    upper optical structures having an area larger than the area of the array of display pixels;
    lower optical structures that are interposed between the active display structures and the upper optical structures, wherein the lower optical structures have curved surfaces that are configured to redirect light from at least the active display structures along the peripheral edge, wherein the upper optical structures have a planar upper surface and a lower surface with curved edge surfaces that are configured to redirect light that has passed though the lower optical structures, and wherein the curved surfaces of the lower optical structures are concave and the curved edge surfaces of the upper optical structure are convex;
    a glass display cover layer that overlaps the upper optical structures and the lower optical structures; and
    an antireflection coating formed over the upper optical structures.

12. The electronic device defined in claim 11 wherein the lower optical structures comprise an opening that overlaps the array of display pixels.

13. The electronic device defined in claim 11 wherein the lower optical structures comprise Fresnel lens structures.

14. The electronic device defined in claim 11, wherein the glass display cover layer has first and second opposing planar surfaces, and wherein the second planar surface forms an exterior surface of the electronic device.

15. The electronic device defined in claim 11, wherein the antireflection coating is interposed between the upper optical structures and the glass display cover layer.

16. The electronic device defined in claim 11, wherein the glass display cover layer is interposed between the upper optical structures and the antireflection coating.

17. A display, comprising:
   active display structures that include an array of display pixels with a rectangular shape and a peripheral edge;
   glass structures having portions that run along the peripheral edge and having a central opening that overlaps the array of display pixels, wherein the glass structures have curved surfaces that redirect light from at least some of the display pixels along the peripheral edge; and
   a glass sheet having a planar upper surface and a lower surface with curved edge surfaces that are configured to redirect the light to provide the display with an area that displays images that is larger than the rectangular shape, wherein the curved surfaces of the glass structures are concave and the curved edge surfaces of the glass sheet are convex.

18. The display defined in claim 17 wherein the array of display pixels comprises an array of liquid crystal display pixels.

19. The display defined in claim 17 wherein the glass structures comprise Fresnel lens structures.

20. The display defined in claim 17, wherein the glass structures have an index of refraction between 1.4 and 1.8 and the glass sheet has an index of refraction between 1.4 and 1.8.

* * * * *